United States Patent [19]

Mott

[11] Patent Number: 5,690,571

[45] Date of Patent: Nov. 25, 1997

[54] HYBRID ROLLER AND SILENT CHAIN

[75] Inventor: Philip J. Mott, Dryden, N.Y.

[73] Assignee: Borg-Warner Automotive, Inc., Sterling Heights, Mich.

[21] Appl. No.: 710,018

[22] Filed: Sep. 11, 1996

[51] Int. Cl.[6] ............................................. F16G 13/04
[52] U.S. Cl. .................................. 474/212; 474/215
[58] Field of Search .................................. 474/202, 206, 474/212–215, 231, 901, 153

[56] References Cited

U.S. PATENT DOCUMENTS

| 1,192,674 | 7/1916 | Oakes . | |
|---|---|---|---|
| 2,722,843 | 11/1955 | Edwards . | |
| 4,186,617 | 2/1980 | Avramidis et al. . | |
| 4,342,560 | 8/1982 | Ledvina et al. . | |
| 4,345,904 | 8/1982 | Numazawa et al. | 474/215 |
| 4,758,210 | 7/1988 | Ledvina . | |
| 5,222,920 | 6/1993 | Cheesman et al. | 474/21.3 |
| 5,226,856 | 7/1993 | Iacchetta et al. . | |
| 5,427,580 | 6/1995 | Ledvina et al. . | |
| 5,464,374 | 11/1995 | Mott | 474/228 X |

Primary Examiner—Roger J. Schoeppel
Attorney, Agent, or Firm—Sidley & Austin; Greg Dziegielewski

[57] ABSTRACT

A hybrid chain assembly includes structure from both roller chain and silent chain. The inner chain links include bushings that ride along the teeth of a sprocket and the outer chain links include link plates including depending members as found in silent chains which contact the teeth of a sprocket.

11 Claims, 2 Drawing Sheets

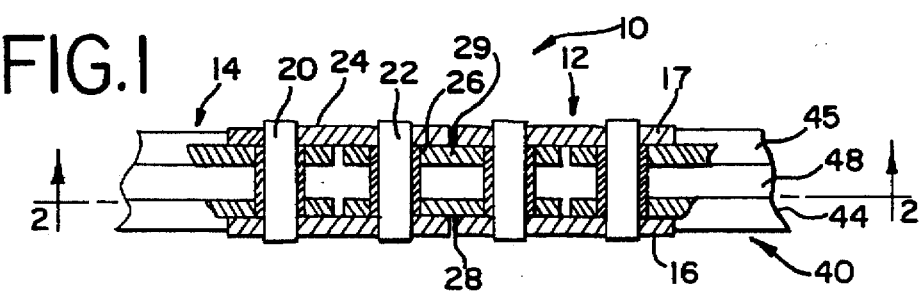
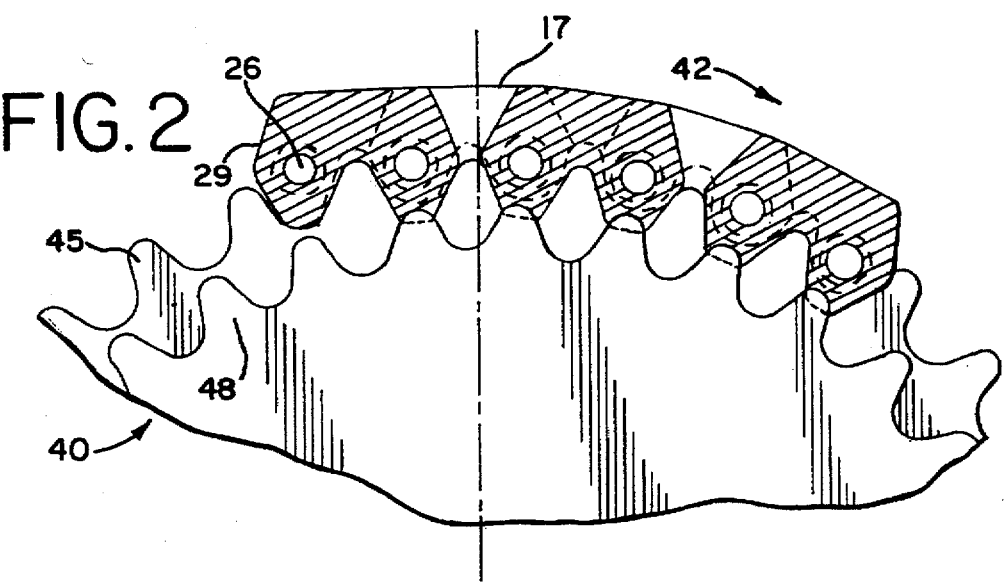
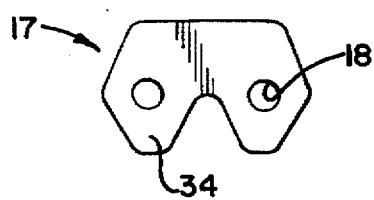
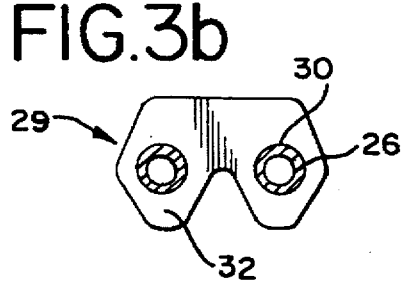
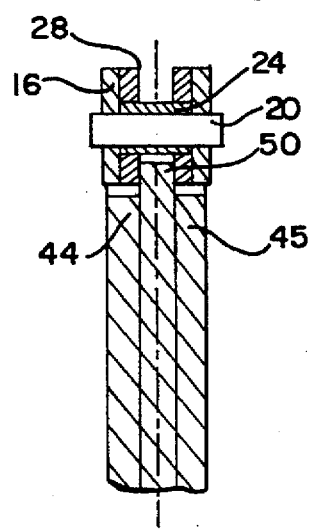

HYBRID ROLLER AND SILENT CHAIN

BACKGROUND OF THE INVENTION

Reference is made to the subject matter of U.S. Pat. No. 5,427,580, entitled "Phased Chain Assemblies," the subject matter of which is incorporated herein by reference.

The present invention relates generally to power transmission chains. The invention has particular application to power transmission chains of the roller chain and silent chain variety, which have automotive applications as part of engine timing systems and also in the transfer of power from a torque converter to a transmission or in a transfer case of a four-wheel drive vehicle.

One type of chain is known as "roller chain." A typical roller chain consists of alternate inner links and outer links. The inner links, which are also known as "bushing" links, consist of spaced sidebars with bushings tightly received in openings, or apertures, at each end of the sidebars. The outer links, which are also known as "pin" links or "guide" links, consist of spaced sidebars with pins tightly received in openings, or apertures, at each end of the sidebars. The bushings freely rotate about the pins to pivotally connect the outer links to the inner links in alternate arrangement. Rollers are provided on the bushings, and when the roller chain is wrapped about a sprocket, the teeth of the sprocket are received between the laterally spaced sidebars and the longitudinally spaced rollers. Examples of roller chain are found in U.S. Pat. Nos. 4,186,617 and 5,226,856, which are both incorporated herein by reference.

Roller chain drives can include both "true roller" and rollerless design. The true roller design includes the described rollers mounted about the bushings. Rollerless chain contains bushings that directly contact the sprocket. Both types of roller chain are typically specified in industry as British Standard chain and American National Standards Institute (ANSI) chain.

In conventional roller chain, outside links or pin links are press fit on the pins. The pins typically extend out beyond the edges of the outside links in the transverse direction of the chain, i.e., the direction transverse to the longitudinal movement of the chain around the sprockets.

A conventional roller chain drive is comprised of an endless roller chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. Various types of engine timing systems and configurations, which are suitable for roller and inverted tooth chain assemblies, are also shown in U.S. Pat. No. 5,427,580, which is incorporated herein by reference.

Another type of power transmission chain is referred to as "silent chain." Such chain is formed of interleaved sets of inverted tooth links. A set or rank of links is assembled from several links positioned alongside of or adjacent to each other. The links are connected by pivot means, which are typically round pins received in a pair of apertures. An example of silent chain is found in U.S. Pat. No. 4,342,560, which is incorporated herein by reference.

Conventional silent chains typically include both guide links and inverted tooth links. The guide links are positioned on the outside edges of alternate sets of links. The guide links typically act to position the chain laterally on the sprocket. Guide links typically do not mesh with the sprocket.

The inverted tooth links, or sprocket engaging links, provide the transfer of power between the chain and sprocket. Each inverted tooth link typically includes a pair of apertures and a pair of depending toes or teeth. Each toe is defined by an inside flank and an outside flank. The inside flanks are joined at a crotch. The inverted tooth links are typically designed so that the links contact the sprocket teeth to transfer power between the chain assembly and the sprocket. The inverted tooth links or driving links contact the sprocket teeth along their inside link flanks or their outside link flanks or combinations of both flanks. The contacts between the links and the sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. The rotation of a camshaft is thus controlled by and dependent on the rotation of the crankshaft through the chain. A chain for an engine timing drive application is shown in U.S. Pat. No. 4,758,210, which is incorporated herein by reference.

Noise is mainly associated with chain drives. Noise is generated by a variety of sources, but in roller chain drives it can be caused, in part, by the impact sound generated by the collision of the chain and the sprocket at the onset of meshing. The loudness of the impact sound is affected by, among other things, the impact velocity between the chain and the sprocket and the mass of chain rollers contacting the sprocket at a particular moment or time increment.

Many efforts have been made to decrease the overall noise level and pitch frequency noise distribution in automotive chain drives to minimize the objectionable effects of the pure sonic tones. Silent chains are typically used in automotive applications where noise generation must be minimized. Modifications of the link flank shape and profile have been used to minimize noise.

Roller chains are also used in automotive applications, but usually are limited to applications where noise generation may not be of primary concern. Roller chains are characterized by the resistance to wear exhibited by the components.

SUMMARY OF THE INVENTION

The present invention is directed to a hybrid or composite chain assembly that includes structural components from both roller chain and silent chain. In one embodiment, the present invention includes a chain constructed of interleaved inner and outer links. Each outer link has a pair of outer link plates. Each outer link plate is mounted to a pair of spaced pin members and has a pair of apertures for receiving the pin members. Each inner link has a pair of inner link plates. Each inner link plate is mounted to a pair of bushings and has a pair of apertures for receiving the bushings. The bushings are mounted to turn on the pin members of the outer links. In one embodiment, the outer and inner link plates include depending members or inverted teeth, as found in silent chains, which contact the teeth of a sprocket.

The present invention also includes hybrid chains wherein the outer links are guide links, as found in roller chains, which serve to guide and laterally align the chain over the sprocket assembly.

In an alternative embodiment of the present invention, the hybrid chain contains inner link plates without inverted teeth or depending members which mesh with the sprocket teeth.

The sprocket assembly is formed with outer portions that are constructed to mesh with the inverted teeth of the outer and inner link plates and an interior portion. In a first embodiment, the interior portion of the sprocket assembly is designed to avoid the bushings and guide the chain assembly on the sprocket by lateral contact with the inner link plates. In a second embodiment, the interior portion of the sprocket assembly is constructed to contact the bushings of the chain and outer portions of the sprocket assembly.

BRIEF DESCRIPTION OF THE DRAWINGS

For a more complete understanding of the invention, one should refer to an embodiment illustrated in greater detail in the accompanying drawings and described below by way of an example of the invention. In the drawings, which are not to scale:

FIG. 1 is a top view of a chain assembly in accordance to the present invention in contact with a sprocket.

FIG. 2 is a sectional view through line 2—2 of FIG. 1.

FIG. 3a is a side view of an outer link plate from the chain assembly of FIG. 1.

FIG. 3b is a side view of an inner link plate from the chain assembly of FIG. 1.

FIG. 5 is a sectional view through line 5—5 of FIG. 4.

DETAILED DESCRIPTION OF THE PREFERRED EMBODIMENTS

Figure 4:
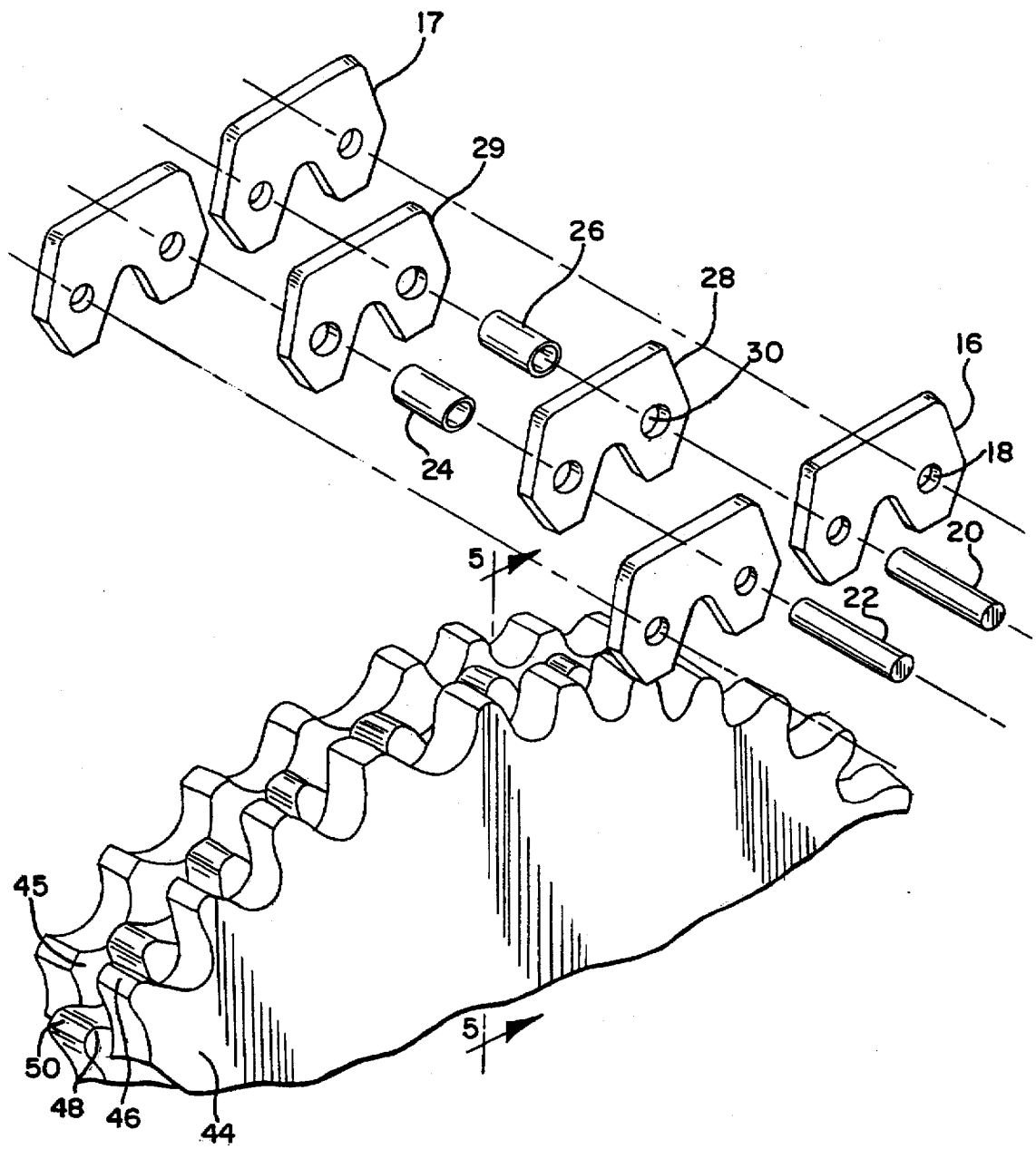
FIG. 4 is a perspective view of the chain assembly and sprocket of FIG. 1 showing a portion of the chain assembly in an exploded view.

Turning now to the drawings, FIG. 1 illustrates a portion of the hybrid chain assembly generally at 10. The chain 10 is constructed by a series of links, pins and bushings.

The complete chain drive (not shown) includes an endlessly connected chain 10 wrapped about at least a pair of sprocket assemblies. The sprocket assemblies are mounted on shafts, such as an engine crankshaft or engine camshaft. The sprocket assemblies may be of unequal diameters and may have an unequal number of teeth of various shapes. The chain and sprocket system can also include an idler sprocket.

The chain 10 includes a series of interleaved outer links 12 and inner links 14. The outer links 12 are formed by a pair of outer link plates 16, 17, or sidebars. The inner links are likewise formed by a pair of inner link plates 28, 29.

The outer link plates 16, 17 are fixed to or press fit on a pair of pin members 20, 22. The pin members 20, 22 are spaced apart and fitted through apertures 18 in the outer link plates 16, 17. The pin members 20, 22 are typically secured in the outer link plates 16, 17 by a press fit, or welding, caulking or any other means known in the art.

The inner link plates 28, 29 are fixed to a pair of bushings 24, 26. The bushings 24, 26 are generally cylindrical in shape. The bushings 24, 26 are spaced apart and fitted through apertures 30 in the inner link plates 28, 29. The bushings 24, 26 are typically secured in the inner link plates 28, 29 by a press fit, or by welding, caulking or any other means known in the art.

The bushings 24, 26 are mounted about the pin members 20, 22 and are freely rotatable about the pin members 20, 22. Thus, a rotation of the bushings 24, 26 about the pin members 20, 22 allows pivoting of the outer links 12 with respect to the inner links 14. In another embodiment of present invention, rollers (not shown) can be mounted about the bushings 24, 26 that are freely rotatable about the bushings 24, 26. The rollers are generally cylindrical in shape and contact teeth 50 of the inner sprocket layer 48.

As respectively shown in FIGS. 3a and 3b, the outer link plates 16, 17 and inner link plates 28, 29 are both inverted tooth or silent chain links. Outer link plates 16, 17 have outer depending members 34 adapted to contact sprocket teeth 46, as shown in FIG. 2. Similarly, inner link plates 28, 29 have depending members 32 adapted to contact sprocket teeth 46, as shown in FIG. 2. Alternatively, the inner link plates without depending members (not shown) may be used, in which case the sprocket assembly 40 may be grooved to receive the inner link plates.

Thus, as shown in FIG. 4, the chain assembly 10 is constructed by inserting the pin members 20, 22 within the bushings 24, 26. The bushings 24, 26 are then secured to a pair of inner link plates 28, 29 and the pin members 20, 22 are then secured to a pair of outer link plates 16, 17. The inner links and outer links are alternated in series to form an endless chain. The length of the chain and exact number of links is determined by, among other things, the application and center distance between the sprocket assemblies.

As shown in FIG. 5, the sprocket assembly 40 in contact with the chain assembly 10 is a composite of a first outer sprocket layer 44, an inner sprocket layer 48 and a second outer sprocket layer 45. As shown in FIGS. 2 and 5, the outer sprocket layer 44, 45 contains (outer) sprocket teeth 46. When the sprocket assembly 40 has a driving direction shown by arrow 42, the depending members 32 of the outer link plate 16, 17 are adapted to contact the teeth 46 of the outer sprocket layer 44, 45.

Similarly, the depending members 34 of the inner link plate 28, 29 are also adapted to contact the sprocket teeth 46 of the outer sprocket layer 44, 45. In an alternative embodiment of the present invention wherein the inner link plates do not include depending members (not shown), the sprocket teeth 46 only mesh with the depending members 32 of the outer link plates 16, 17.

As shown in the figures, the outer links 12 and the inner links 14 of the hybrid chain assembly are adapted to receive the teeth 50 of an inner sprocket layer 48 between the inner link plates 28, 29. In one embodiment of the invention, the inner sprocket teeth 50 are spaced from the bushings 24, 26 and thereby designed to avoid the bushings, as shown in FIG. 5. Rather, the teeth 50 only serves to guide the chain assembly on the sprocket assembly 40 by lateral contact with the inner link plates 28, 29. This configuration allows the chain to engage the sprocket assembly 40 in a manner similar to that of a silent chain, thus minimizing noise levels.

In a second embodiment of the present invention, the inner sprocket teeth are designed to directly contact the bushings (not shown). In this embodiment, bushings seat in the root between the inner sprocket teeth. Thus, in operation, the teeth of the outer link plates drivingly contact the outer sprocket laminate teeth and the teeth of the inner link plates drivingly contact the same.

While allowing the bushings or rollers to contact teeth 50 decreases the noise reduction benefits of the sprocket configuration in the first embodiment, a sprocket configuration that contacts the bushings provides increased and/or more stable load-carrying capabilities.

The present invention is directed to providing a chain assembly having the advantage of lower noise generation, usually associated with silent chain types, as well as having components, which are usually in roller chain types, with increased resistance to wear.

While several embodiments of the present invention have been illustrated, it will be understood that the invention is not limited to these embodiments. Those skilled in the art to which the invention pertains may make modifications and other embodiments employing the principles of the invention, particularly upon considering the foregoing teachings.

What is claimed is:

1. A chain assembly, comprising:
    a series of interleaved inner and outer links, said outer links having a pair of outer link plates fixedly mounted to spaced pin members, each outer link plate having a pair of apertures for receiving said pin members;
    said inner links having a pair of bushings mounted to turn on said pin members of said outer links, said inner links having a pair of inner link plates fixedly mounted to said bushings, each inner link plate having a pair of apertures for receiving said bushings;
    said outer link plates having a pair of outer depending members adapted to contact a first set of teeth of the sprocket assembly;
    said inner links and said outer links being adapted to receive a second set of teeth of a sprocket assembly between said inner link plates.

2. The chain assembly of claim 1 wherein said inner link plates have a pair of depending members adapted to contact said first set of teeth of the sprocket assembly.

3. The chain assembly of claim 1 wherein the second set of teeth is constructed to guide and laterally align the chain assembly on the sprocket assembly.

4. The chain assembly of claim 1 wherein the second set of sprocket teeth are spaced from said bushings.

5. The chain assembly of claim 2 wherein said sprocket assembly is formed from a plurality of layers, said layers including an outer layer having outer sprocket teeth constructed and arranged to mesh with said outer depending members of said outer link plates and an inner sprocket layer having teeth constructed and arranged to contact said bushings.

6. The chain assembly of claim 5 wherein said outer sprocket teeth are constructed and arranged to mesh with said depending members of said inner link plates.

7. The chain assembly of claim 6 wherein said sprocket assembly includes a plurality of outer sprocket layers, said inner sprocket layer being located between a pair of said outer sprocket layers.

8. A chain assembly, comprising:
    a series of interleaved inner and outer links, said outer links having a pair of outer link plates fixedly mounted to spaced pin members, each outer link plate having a pair of apertures for receiving said pin members;
    said inner links having a pair of bushings mounted to turn on said pin members of said outer links, said inner links having inner link plates fixedly mounted to said bushings, each inner link plate having a pair of apertures for receiving said bushings;
    said outer link plates having a pair of outer depending members adapted to contact a first set of teeth of the sprocket assembly;
    said inner links and said outer links being adapted to receive a second set of teeth of a sprocket assembly between said inner link plates.

9. The chain assembly of claim 8 wherein the second set of sprocket teeth are spaced from said bushings.

10. The chain assembly of claim 8 wherein said sprocket assembly is formed from a plurality of layers, said layers including an outer layer having outer sprocket teeth constructed and arranged to mesh with said outer depending members of said outer link plates and an inner sprocket layer having teeth constructed and arranged to contact said bushings.

11. The chain assembly of claim 8 wherein the second set of sprocket teeth is constructed to guide and laterally align the chain assembly on the sprocket assembly.

* * * * *